United States Patent Office 3,231,404
Patented Jan. 25, 1966

3,231,404
MARKING COMPOSITION
Thomas H. Ferrigno, Metuchen, N.J., assignor to Minerals & Chemicals Philipp Corporation, Menlo Park, N.J., a corporation of Maryland
No Drawing. Filed Apr. 26, 1963, Ser. No. 276,074
8 Claims. (Cl. 106—287)

This invention has to do with compositions for marking boundaries and relates especially to pigmented compositions adapted for marking the periphery of mine fields.

It is customary to mark the boundary of mine fields by laying barbed wire fencing or tape around the periphery of the field. While durable boundaries can be established by use of barbed wire, an excessive weight of wire or tape is required to outline the field. There has been a longfelt and unsatisfied need for a particulate marking composition to replace barbed wire or tape markers.

Prior art particulate solid marking materials, such as those used to mark boundaries for athletic fields, fail to meet the requirements of military marking material, which requirements are substantially as follows:

(1) The marking material must be visible to the naked eye in the daylight at a minimum distance of 10 yards;
(2) The boundary formed by the marking material should last at least 3 months, preferably 6 months;
(3) The marking material should be nontoxic to humans and animals;
(4) The marking material should be capable of being dispensed or applied mechanically over the speed range of from one to five miles per hour;
(5) The marking material should be stable in all weather and through all climatic conditions and should be capable of use over the temperature range of −25° F. to 125° F. under all humidity conditions;
(6) The material must not impose a logistic burden of more than one pound per fifty linear feet marked when dispensed in a 6-inch width line, i.e., the material must cover at least twenty-five square feet per pound;
(7) The material must be capable of being dispensed by lightweight inexpensive equipment.

Accordingly, an object of this invention is the provision of marking compositions which satisfy the requirements enumerated above.

A further object is the provision of particulate marking material which can be applied in dry form or dispersed in an aqueous vehicle.

Another object is the provision of a novel treated titanium dioxide pigment product.

A more specific object is the provision of an organosilyl coated titanium dioxide pigment having unique and valuable adhesion and dispersion properties.

Further objects and features will be readily apparent from a description thereof which follows.

Stated briefly, the marking composition of the subject invention comprises discrete, free-flowing foliage-adherent particles having the following essential components:

(1) A core of rutile titanium dioxide pigment.
(2) A hydrophobic interlayer, bonded to the surface of the titanium dioxide pigment through silicon-oxygen linkages, of alkenyl siloxane groups having a carbon-to-carbon double bond directly attached to silicon, especially vinyl siloxane groups.
(3) An outer layer, adherent to said siloxane interlayer, of a small amount of a particular type of water-dispersible nitrogen-containing polyoxyalkylene compound, namely, a quaternary derivative of an ethoxylated long chain amine.

The novel titanium dioxide marking composition of this invention is produced by contacting titanium dioxide pigment with a polyfunctional hydrolyzable unsaturated silane, and hydrolyzing and polymerizing the silane in the presence of the pigment to form a hydrophobic siloxane coating that is bonded to the normally hydrophilic pigment surface. A quaternary ethoxylated amine derivative is then applied to produce an adherent positively charged hydrophilic coating on the hydrophobic siloxane coated titanium dioxide particles.

The quaternary derivative of an ethoxylated long chain amine is an essential ingredient of the composite pigment particles of this invention. In the absence of the quaternary derivative as an exterior coating, the siloxane coated hydrophobic titanium dioxide is rapdily washed from foliage or grass by rain and melting snow. The quaternary derivative, which provides a highly electropositive charge on the surface of the titanium dioxide, markedly improves the retention of the siloxane coated pigment on leaves and grass. Further, the quaternary derivative also prevents agglomeration of the siloxane coated titanium dioxide so that coated pigment can be applied with dusting equipment. The quaternary derivative, being a surface active material, also permits the hydrophobic titanium dioxide to be dispersed readily in water to form sprayable compositions. Surfactants outside the scope of this invention, including the polyethoxylated long chain amines from which the quaternary derivatives are obtained by alkylation, fail to improve the substantivity of the siloxane coated titanium dioxide to foliage as do the polyethoxylated quaternary ammonium derivatives that are employed in carrying out this invention.

The coated titanium dioxide composition of this invention can be applied to grass or foliage as a powder or as 10% to 40% aqueous dispersions of the powder. Aqueous dispersions of the powder are obtained by mildly agitating the powder in water and no special equipment is required to obtain such dispersions. Durability of the marking material on the foliage will vary with the growth rate of the foliage and climatic conditions. Under average temperature zone conditions of temperature and rainfall in spring and fall, the visual duration of the coated titanium dioxide exceeded three months when the composition was applied at satisfactory coverage rates in the form of a dry powder or as an aqueous dispersion.

Generally speaking, adhesion of the powder to foliage is improved when the powder is applied as an aqueous dispersion or when the powder is applied to foliage when the foliage is moist.

The composition can be applied to grass as two or three 6-inch lines with a 6-inch unmarked space between lines to get a halo effect.

More specifically, the titanium dioxide pigment employed in carrying out this invention must be in the rutile form and is preferably a medium chalking resistant grade. Aluminum silicate modified rutile titanium oxide of the type that is specified in Federal Specification for titanium dioxide TT–T–425, type III, class B (May 2, 1944 and amendment, October 1944) is recommended. This type of pigment contains a minimum of 94% $TiO_2$, 1.5%–2.3% $Al_2O_3$ and 0.6%–1.0% $SiO_2$ and is produced by treating the rutile crystal form of titanium dioxide with sodium silicate and aluminum sulfate to form an aluminum silicate coating on the rutile particles and removing soluble sodium sulfate reaction products. Type III, class B titanium dioxide is available commercially under the trademark Titanox RA–50. Following are specifications of Titanox RA–50 which conform with the requirements of type III, class B titanium dioxide pigment as set forth in TT–T–425.

| | |
|---|---|
| Min. wt. percent $TiO_2$ | 94 |
| Additive, $Al_2O_3$, $SiO_2$ | |
| Crystal structure of $TiO_2$ | Rutile |
| Refractive index (mean) | 2.7 |
| Average particle size [1] | |
| mean diameter, microns | 0.3–0.4 |
| Relative resistance to chalking | 70 |

[1] By centrifugal sedimentation method, I & EC, anal. ed. 1S 360, 946.

It has been found that other white pigments, e.g., kaolin clay, and other types of titanium dioxide pigments, e.g., type IV, class C titanium dioxide, which is a $$ZnO_2\text{—}Al_2O_3\text{—}SiO_2$$

treated rutile having a high chalking resistance of 100, are not merely as effective as type III, class B pigment. The kaolin clay and the highly chalking resistant rutile do not become as spectacularly hydrophobic as type III, class B pigment when treated with vinyl silane and, therefore, marking compositions made with such pigments are markedly inferior to compositions made with type III, class B titanium dioxide pigment.

The unsaturated siloxane coating on the titanium oxide particles is provided by contacting the pigment particles (which normally contain an adherent film of water) with a hydrolyzable organosilane and an agent, such as acid, to promote hydrolysis and polymerization of the silane. The silanes employed in carrying out this invention contain at least one organic group having an aliphatic carbon-to-carbon double bond attached directly to silicon, and the remaining groups being those which are hydrolyzable upon contact with hydroxyl group to form new silicon-oxygen bonds. Suitable organosilanes have the following general formula:

$$R_aSiX_{(4-a)}$$

wherein X is a hydrolyzable group selected from chlorine, bromine, oxyaryl, oxyaliphatic and alkoxy aliphatic alkoxy, R is an unsaturated hydrocarbon of the group consisting of vinyl and acrylyl, and a is an integer from 1 to 2, inclusive. The radical designated $CH_2{:}CH{\cdot}CO{-}$ is known as the "acrylyl" radical, as shown in Hackh's "Chemical Dictionary," third edition (1944). In other words, suitable silanes contain only unsaturated groups such as vinyl groups and hydrolyzable groups and at least one of the groups is unsaturated and at least two groups are hydrolyzable.

Species of hydrolyzable unsaturated silanes include divinyl dichlorosilane, vinyltrichlorosilane, vinyltriethoxysilane, vinyltrimethoxysilane and acrylate modified trimethoxysilane. The preferred silanes are hydrolyzable vinyl tris(alkoxy)silanes, especially vinyl tris(2-methoxyethoxy)silane, a material of the formula $$H_2C\text{=}CH\text{—}Si(OC_2H_4OCH_3)_3$$

and known in the art as "A–172." A–172 is water soluble and is easier to apply than alkoxy silanes which are water insoluble or chlorosilanes which must be applied in vapor form.

The preparation of unsaturated alkoxy silanes is described in U.S. Patent No. 2,551,924 to Edith M. Boldebuck. The preparation of vinyl tris(2-methoxyethoxyl)silane, the preferred silane for purposes of this invention, is described in J. Org. Chem. 17, 1382–5 (1952). Various methods for preparing alkenyl organohalo silane compounds are described in U.S. Patent No. 2,742,378 to Theodore a TeGrotenhuis. (U.S. 2,742,378 has to do with fine powders and fillers having an olefinic siloxane deposited on the surface and the interpolymerization of the olefinic siloxane with a liquid polymerizable olefinic material, such as styrene monomer.)

In carrying out the present invention, the quantity of silane employed to coat the titanium dioxide pigment particles is sufficient to provide at least a monomolecular coating on the pigment particles. Since difficulty may be experienced in providing a uniform monolayer on the pigment particles, use of a slight excess of silane over that required to provide a monolayer will assure the provision of a hydrophobic pigment. While the silane can be used in amount from about 2 to 3 times the amount required to provide a monolayer, or even more, the use of silane in amount exceeding substantially that required to provide a monolayer on the pigment is undesirable from an economic standpoint. On the other hand, the titanium dioxide pigment will not be sufficiently hydrophobic when less than a monolayer of siloxane is provided thereon. The quantity of silane required to provide a siloxane coating of desired thickness on a given quantity of titanium dioxide pigment will very with the surface area of the titanium dioxide and with the surface area coverage of the silane monomer. Using the B.E.T. surface area value of the pigment, JACS 60, 309 (1938), the weight of silane can be calculated from the formula:

$$\frac{\text{Wt. } TiO_2 \times \text{surface area of } TiO_2 \text{ (m.}^2\text{/g.)} \times \text{coating thickness}}{\text{Silane coverage for one molecular layer}} = \text{wt. silane}$$

For example, published data indicates that A–172 vinyl silane has an average coverage of 370 m.$^2$/g. The weight of A–172 required to cover 100 grams of a $TiO_2$ filler having a surface area of 10 m.$^2$/g. with a monolayer of $CH_2\text{=}CHSiO_3/2$ would be calculated as follows:

$$\frac{100 \text{ g. } TiO_2 \times 10 \text{ m.}^2/\text{g.} \times 1 \text{ molecular layer}}{370 \text{ m.}^2/\text{g. coverage for molecular layer of A–172}}$$

$$= 2.7 \text{ g. A–172 vinyl silane}$$

Titanium dioxide which is uniformly covered with at least a monolayer of hydrolyzed vinyl silane within the scope of this invention is completely hydrophobic. For example, when added to water, the treated pigment will not sink in water even after standing for two weeks.

Sufficient moisture must be present on the surface of the titanium dioxide pigment or must be added to the pigment to allow complete hydrolysis and polymerization of the monomeric silane. The quantity of water will vary with the degree of functionality of the silane and is calculated as follows:

Wt. water necessary (g.) =

$$\frac{\text{wt. silane needed (g.)} \times \text{functionality of silane} \times 18}{\text{molecular weight of silane}}$$

Quantities of water required with a variety of commercial silanes are given in a publication of Silicones Division, Union Carbide Corporation entitled "Treatment of Inorganic Fillers With Union Carbide Silicones." In the case of vinyltriethoxysilane, published data indicate that water is required in amount of 0.28 gram water per gram monomer for complete reaction of vinyltriethoxysilane. With A–172 vinyl silane, 0.19 gram water is required per gram monomer. Procedure for coating filler material with silanes and hydrolyzing the silanes in the presence of the filler are well known and are described in full detail at pages 15 to 20 of "Treatment of Inorganic Fillers With Union Carbide Silicones." Also described in this publication are procedure for removing volatile reaction products of the hydrolysis (HCl when chlorosilanes are used or alcohols or esters when alkoxy silanes are used).

With most titanium dioxide pigments, addition of water to the pigment will be required to obtain complete reaction and an acid or base will be required to accelerate hydrolysis.

The quaternized polyoxyethylated ammonium derivative that is employed may be represented by the following formula:

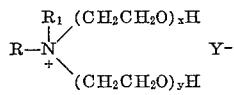

wherein R is an aliphatic group having at least 8, and preferably 12 to 18 carbon atoms, $R_1$ is an alkyl group having from 1 to 2 carbon atoms, $x$ and $y$ are integers each having a value of at least 1 and totalling between 2 and 50, preferably between 2 and 15, inclusive, and Y is a monovalent anion.

As representative of R in the formula, the following may be mentioned: dodecyl, dodecenyl, tetradecyl, tetradecenyl, hexadecyl, hexadecenyl, octadecyl, octadecenyl, and octadecadienyl; also mixtures of long chain aliphatic radicals such as found in naturally fatty acid mixtures obtained from animal oils and vegetable oils. For example, R may be derived from coconut oil and comprises a mixture of hexyl, octyl, decyl, dodecyl, tetradecyl, hexadecyl, octadecyl, octadecenyl and octadecadienyl radicals. R may be derived from soybean oil and comprises a mixture of hexadecyl octadecyl, eicosyl, octadecenyl, octadecadienyl, and octadecadienyl radicals. When derived from tallow, R comprises a mixture of the following radicals: dodecyl, tetradecyl, hexadecyl, hexadecenyl, octadecyl, octadecenyl, octadecadienyl, and eicosyl.

Suitable quaternary derivatives of ethoxylated fatty amines are described in U.S. Patent No. 2,974,005 and British Patent No. 857,170, February 25, 1959, and are known by the trademark Ethoquad, e.g., Ethoquad 18/25, Ethoquad C/25 and Ethoquad O/12. The letters or numbers preceding the slant bar indicate from which fatty acid the quaternary compound was derived, e.g., Ethoquad C/25 is derived from coconut oil and Ethoquad 18/25 is derived from stearic acid. The numbers following the slant bar indicate, after deduction of 10, the total number of molecules of ethylene oxide which have been reacted with one molecule of the quaternary ammonium compound. Ethoquads are produced by treating ethoxylated amines of the type known as Ethomeens with a lower alkyl chloride such as methyl chloride or ethyl chloride. Ethomeens, described in U.S. Patent No. 2,819,210, contain a single long chain hydrocarbon group and two oxyethylene chains. The production of Ethoquad C/25 from Ethomeen C/25 is illustrative:

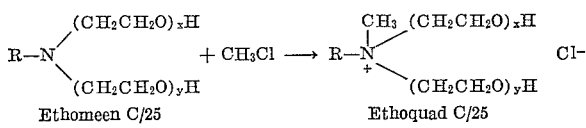

wherein R—N< is derived from coconut fatty acid and $x+y=15$.

The quantity of polyethoxylated quaternary derivative added to the silane treated titanium dioxide pigment varies within the range of from about 1% to 4%, preferably about 3%, based on the weight of the titanium dioxide. When employed in amount appreciably less than 1% by weight, the siloxane coated titanium dioxide will not be retained to a satisfactory extent on grass or foliage. On the other hand, when employed in amount in excess of about 4%, the coated titanium dioxide is excessively water dispersible and may be readily washed off foliage by heavy rainfall. The optimum quantity of quaternary ammonium compound will obviously vary with the number of molecules of ethylene oxide per mol of quaternary nitrogen compound and smaller quantities of a polyethoxylated quaternary derivative containing 25 molecules ethylene oxide per mol will be required than when the quaternary derivative contains only 2 molecules of ethylene oxide per mol.

*Example I*

In accordance with this invention a mine field marking material was produced as follows: 100 parts by weight of Titanox-RA-50 was sprayed in a rotating drum with 3.03 parts by weight of a freshly prepared mixture of $H_2C=CH-Si(OC_2H_4OCH_3)_3$ (A-172) mixed with 1% by weight of glacial acetic acid. The sprayed mixture was heated at 220° F. for about thirty minutes to assure complete reaction of the silane and then passed through a screen mill fitted with a 0.027″ screen. The resultant powder was readily washed off foliage during rainfall and, further, the powder tended to agglomerate and could not be applied with mechanical equipment to foliage as a dry dust. The powder was not wet by water and thus could not be applied to foliage by spraying.

The vinyl siloxane coated rutile was returned to the rotating drum and while the powder was tumbled it was sprayed with a 25% aqueous solution of stearylmethyl-di(polyethoxy)ammonium chloride containing 15 mols of ethylene oxide per mol of quaternary salt, (Ethoquad 18/25), using 3 parts by weight of Ethoquad 18/25 to 100 parts by weight of Titanox. The mixture was dried at 220° F. and milled using a 0.027″ screen.

A 40% aqueous dispersion of the powder, obtained by agitating 40 parts by weight of the coated titanium dioxide in 60 parts of water, had a coverage of from 50–60 ft.²/lb. as compared with a coverage of 20–25 ft.²/lb. for the dry powder.

*Example II*

Still in accordance with this invention a freshly prepared mixture of 3.0 parts by weight of A-172 with 0.03 part by weight of glacial acetic acid was sprayed on 100 parts by weight of Titanox-RA-50 in a rotary drum mixer and the ingredients were tumbled at 70° F. for a minute. Three parts by weight Ethoquad 18/25 (in the form of a 25% aqueous solution) were sprayed on the silane treated pigment and the ingredients were tumbled at ambient temperatures for 20 minutes. The ingredients were dried at 220° F. and pulverized using a 0.027″ screen.

*Example III*

Other boundary marking compositions of this invention are produced from the following ingredients using the procedure as set forth in Example II when alkoxy silanes are used. With chlorosilanes, the procedure of Example I is modified by treating the titanium dioxide pigment with saturated vapor of the silane and removing hydrochloric acid reaction product with dry ammonia gas before applying the solution of quaternary ammonium salt.

(1) Parts by wt.
Titanium dioxide (type III, class B) _____ 100
Vinyl trichlorosilane _____ 4

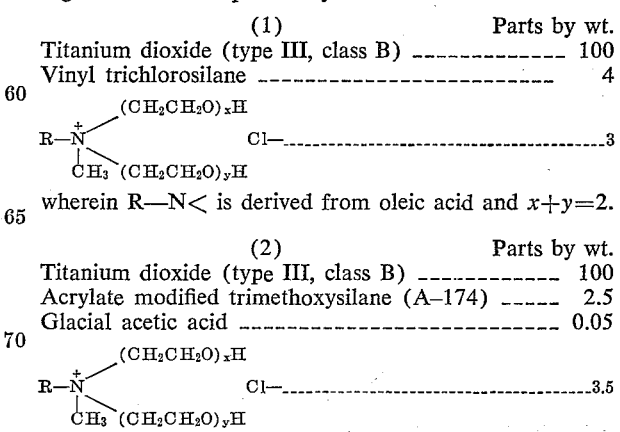

wherein R—N< is derived from oleic acid and $x+y=2$.

(2) Parts by wt.
Titanium dioxide (type III, class B) _____ 100
Acrylate modified trimethoxysilane (A-174) _____ 2.5
Glacial acetic acid _____ 0.05 wherein R—N< is derived from soya oil and $x+y=15$.

| (3) | Parts by wt. |
|---|---|
| Titanium dioxide (type III, class B) | 100 |
| Divinyldiethoxysilane | 3 |
| Glacial acetic acid | 0.03 |

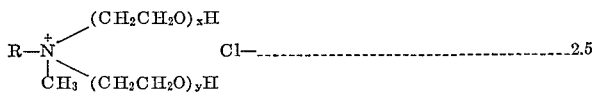 2.5 wherein R—N< is derived from coconut oil and $x+y=25$

I claim:
1. Particles of aluminum silicate modified rutile titanium dioxide pigment analyzing at least 94% $TiO_2$, 1.5% to 2.3% $Al_2O_3$ and 0.6% to 1.0% $SiO_2$, the surface of said pigment particles being rendered hydrophobic by having attached thereto through silicon-oxygen linkages a substantially monomolecular layer of vinyl polysiloxane groups obtained by hydrolyzing a vinyl silane, and, as a uniform exterior layer adherent to said pigment particles through said layer of vinyl siloxane groups, from 2% to 3%, based upon the weight of said pigment particles of a quaternary ammonium derivative of the formula:

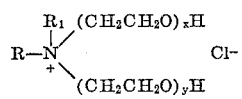

wherein: R is an aliphatic group containing from 12 to 18 carbon atoms, $R_1$ is an alkyl group having from 1 to 2 carbon atoms and $x$ and $y$ are integers each having a value of at least 1 and totalling between 2 and 50, inclusive.

2. The composition of claim 1 in which R—N< is derived from a fatty acid and $x+y=$ an integer having a value from 2 to 15, inclusive.

3. Aluminum silicate modified rutile titanium dioxide pigment of the type specified in Federal specification for titanium dioxide, TT–T–425, type II, class B, said pigment normally having moisture sorbed on the surface thereof, and uniformly coated on the surface of said pigment in a quantity sufficient to render said pigment hydrophobic, a vinyl siloxane obtained by hydrolyzing tris(ethoxymethoxy) vinyl silane in the presence of said pigment and, coated on the exterior surface of said pigment, about 3% by weight of a normally solid polyoxyethylated quaternary ammonium derivative of the formula:

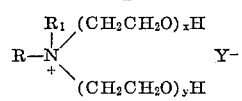

wherein: R is an aliphatic group containing from 8 to 20 carbon atoms, $R_1$ is an alkyl group having from 1 to 2 carbon atoms, $x$ and $y$ are integers each having a value of at least 1 and totalling between 2 and 50, inclusive, and Y is a monovalent anion.

4. A composition adapted for use as a marking material and comprising finely divided rutile titanium dioxide particles having bonded to the surface thereof at least a monolayer of unsaturated aliphatic polysiloxane groups in amount sufficient to render said titanium dioxide particles hydrophobic, said polysiloxane being the hydrolysis product of a silane containing a radical of the group consisting of vinyl and acrylyl, and, uniformly coated on the outer surface of said titanium dioxide particles containing siloxane groups, from about 1% to 4%, based on the weight of said particles, of a polyethoxylated quaternary ammonium salt of the general formula:

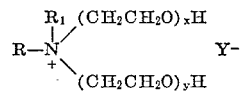

wherein: R is an aliphatic group containing from 8 to 20 carbon atoms, $R_1$ is an alkyl group having from 1 to 2 carbon atoms, $x$ and $y$ are integers each having a value of at least 1 and totaling between 2 and 50, inclusive, and Y is a monovalent anion.

5. A sprayable composition adapted for use as a marking material and comprising water having dispersed therein finely divided rutile titanium dioxide particles having bonded to the surface thereof at least a monolayer of unsaturated aliphatic polysiloxane groups in amount sufficient to render said titanium dioxide particles hydrophobic, said polysiloxane being the hydrolysis product of a silane containing a radical of the group consisting of vinyl and acrylyl, and, uniformly coated on the outer surface of said titanium dioxide particles containing siloxane groups, from about 1% to 4%, based on the weight of said particles, of a polyethoxylated quaternary ammonium salt of the general formula:

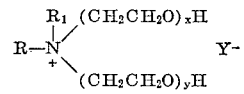

wherein: R is an aliphatic group containing from 8 to 20 carbon atoms, $R_1$ is an alkyl group having from 1 to 2 carbon atoms, $x$ and $y$ are integers each having a value of at least 1 and totaling between 2 and 50, inclusive, and Y is a monovalent anion.

6. Foliage adherent particles of white rutile titanium dioxide pigment of the type specified in Federal specifications for titanium dioxide, TT–T–425, type III, class B having as a uniform exterior coating from about 1% to 4% by weight of a polyethoxylated quaternary ammonium derivative of the general formula:

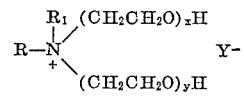

wherein: R is an aliphatic group containing from 8 to 20 carbon atoms, $R_1$ is an alkyl group having from 1 to 2 carbon atoms, $x$ and $y$ are integers each having a value of at least 1 and totaling between 2 and 50, inclusive, and Y is a monovalent anion, and, as an interlayer bonded to the surface of said titanium dioxide through silicon oxygen linkages, sufficient vinyl polysiloxane groups to render said titanium dioxide hydrophobic, said vinyl polysiloxane being the hydrolysis product of a tris(alkoxy) vinyl silane.

7. A composition adapted for use as a marking material comprising aluminum silicate modified rutile titanium dioxide pigment analyzing at least 94% $TiO_2$, the surface of said pigment being rendered hydrophobic by having attached thereto through silicon-oxygen linkages a monolayer of vinyl polysiloxane groups obtained by hydrolyzing a tris(alkoxy) vinyl silane, and, uniformly coated on the surface of said surface modified titanium dioxide pigment particles, from about 1% to 4% by weight of a polyethoxylated quaternary ammonium derivative of the general formula:

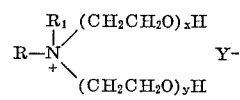

wherein: R is an aliphatic group containing from 8 to 20 carbon atoms, $R_1$ is an alkyl group having from 1 to 2 carbon atoms, $x$ and $y$ are integers each having a value of at least 1 and totaling between 2 and 50, inclusive, and Y is a monovalent anion.

8. A composition adapted for use as a marking material and comprising aluminum silicate modified rutile titanium dioxide pigment particles analyzing at least 94% $TiO_2$, and containing from 1.5% to 2.3% $Al_2O_3$ and from 0.6% to 1.0% $SiO_2$, said particles having bonded to the surface thereof through silicon-oxygen linkages sufficient vinyl polysiloxane groups to render said pigment particles hydrophobic, said vinyl polysiloxane being the hydrolysis product of a tris(alkoxy) vinyl silane, and, uniformly coated on the surface of said hydrophobic titanium dioxide particles, from about 1% to 4% by weight of a polyethoxylated quarternary ammonium derivative of the general formula:

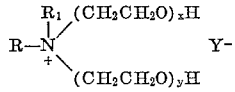

wherein: R is an aliphatic group containing from 8 to 20 carbon atoms, $R_1$ is an alkyl group having from 1 to 2 carbon atoms, $x$ and $y$ are integers each having a value of at least 1 and totaling between 2 and 50, inclusive, and Y is a monovalent anion.

References Cited by the Examiner

UNITED STATES PATENTS

| | | | |
|---|---|---|---|
| 2,717,246 | 9/1955 | Kienle et al. | 106—300 |
| 3,025,179 | 3/1962 | Holbein | 260—37 |

FOREIGN PATENTS

| | | |
|---|---|---|
| 637,145 | 2/1962 | Canada. |
| 643,822 | 6/1962 | Canada. |

MORRIS LIEBMAN, *Primary Examiner.*

UNITED STATES PATENT OFFICE
CERTIFICATE OF CORRECTION

Patent No. 3,231,404                          January 25, 1966

Thomas H. Ferrigno

It is hereby certified that error appears in the above numbered patent requiring correction and that the said Letters Patent should read as corrected below.

Column 3, line 26, for "merely" read -- nearly --; column 7, line 38, for "type II" read -- type III --.

Signed and sealed this 6th day of December 1966.

(SEAL)
Attest:

ERNEST W. SWIDER
Attesting Officer

EDWARD J. BRENNER
Commissioner of Patents